United States Patent [19]

Owa et al.

[11] Patent Number: 5,083,212
[45] Date of Patent: Jan. 21, 1992

[54] APPARATUS AND METHOD FOR RECORDING A COLOR TELEVISION SIGNAL ON AN OPTICAL DISC

[75] Inventors: Hideo Owa; Mikio Sugiki, both of Kanagawa; Hitoshi Okada, Chiba; Hiroo Takahashi, Kanagawa, all of Japan

[73] Assignee: Sony Corporation, Tokyo, Japan

[21] Appl. No.: 562,450

[22] Filed: Aug. 2, 1990

Related U.S. Application Data

[63] Continuation of Ser. No. 180,340, Apr. 11, 1988, abandoned.

Foreign Application Priority Data

Apr. 14, 1987 [JP] Japan ................................. 62-091419

[51] Int. Cl.$^5$ ............................................. H04N 9/81
[52] U.S. Cl. ....................................... 358/319; 358/330;
358/342; 358/343; 360/9.1; 360/19.1; 360/37.1
[58] Field of Search ............... 358/310, 319, 330, 334,
358/341–343; 360/9.1, 19.1, 23, 32, 33.1, 37.1;
371/40.3; 369/44.11, 44.39

[56] References Cited

U.S. PATENT DOCUMENTS

| | | | |
|---|---|---|---|
| 3,893,163 | 7/1975 | Wessels et al. | 358/12 X |
| 4,022,986 | 5/1977 | Teer et al. | 360/23 X |
| 4,150,397 | 4/1979 | Russell | 360/19.1 X |
| 4,208,671 | 6/1980 | Ozawa et al. . | |
| 4,227,213 | 10/1980 | Isobe | 358/343 |
| 4,419,699 | 12/1983 | Christopher et al. | 358/342 X |
| 4,442,461 | 4/1984 | Shirai et al. | 360/19.1 X |
| 4,446,488 | 5/1984 | Suzuki | 358/342 |
| 4,450,488 | 5/1984 | Golding | 358/342 |
| 4,479,150 | 10/1984 | Ilmer et al. | 358/343 X |
| 4,499,502 | 2/1985 | Dakin et al. . | |
| 4,546,389 | 10/1985 | Gibson et al. | 358/342 |
| 4,562,578 | 12/1985 | Odaka et al. | 371/10.3 X |
| 4,597,019 | 6/1986 | Nishimoto et al. | 360/23 X |
| 4,660,099 | 4/1987 | Sugiyama et al. | 358/342 |
| 4,661,863 | 4/1987 | Ichinoi | 360/23 X |
| 4,672,470 | 6/1987 | Morimoto et al. | 360/19.1 X |
| 4,672,471 | 6/1987 | Gouda | 358/342 X |
| 4,779,143 | 10/1988 | Oku et al. | 358/334 |
| 4,785,359 | 11/1988 | Hickok | 360/23 X |
| 4,794,464 | 12/1988 | Sasson | 360/23 X |
| 4,816,928 | 3/1989 | Sasaki et al. | 358/342 X |

FOREIGN PATENT DOCUMENTS

| | | |
|---|---|---|
| 0149244 | 7/1985 | European Pat. Off. . |
| 0192412 | 8/1986 | European Pat. Off. . |
| 2348291 | 4/1975 | Fed. Rep. of Germany . |
| 2945615 | 5/1981 | Fed. Rep. of Germany . |

OTHER PUBLICATIONS

Patent Abstracts of Japan, vol. 9, No. 289 (p. 405) [2012], Nov. 15, 1985 (Matsushita Denki Sangyo K.K.).
Journal of the Audio Engineering Society, vol. 32, No. 11, Nov. 1984, pp. 883–888, Imink et al., "Digital Audio Modulation in the PAL & NTSC Optical Video Disk Coding Format".
Neues Aus Der Technik, No. 1, Feb. 15, 1986, p. 7, "Video-Recording Mit Komprimiertem Audio".

Primary Examiner—Robert L. Richardson
Assistant Examiner—W. R. Young
Attorney, Agent, or Firm—Alvin Sinderbrand; William S. Frommer

[57] ABSTRACT

In an apparatus and method for optically recording on an optical disk a television signal comprised of a color image signal and an audio signal; one horizontal period portion of an original luminance signal and one horizontal period portion of two original color difference signals from a standard television signal are time-base-compressed to generate a time-base-compressed video signal for one horizontal period, the audio signal is digitized and time-base-compressed, and then the time-base-compressed digital audio signal and the time-base-compressed video signal are time-division-multiplexed with each other and recorded on the optical disk.

3 Claims, 5 Drawing Sheets

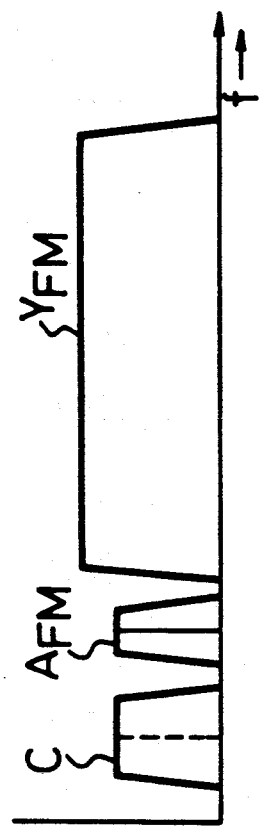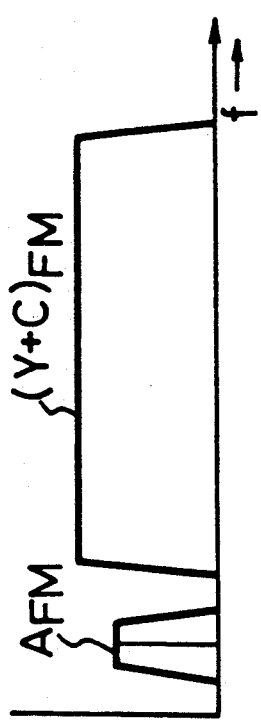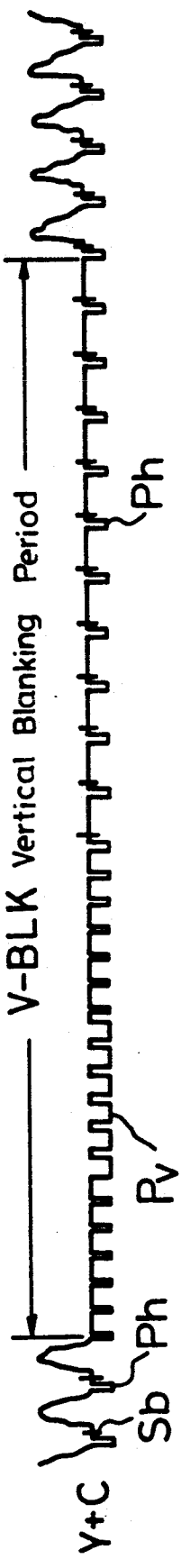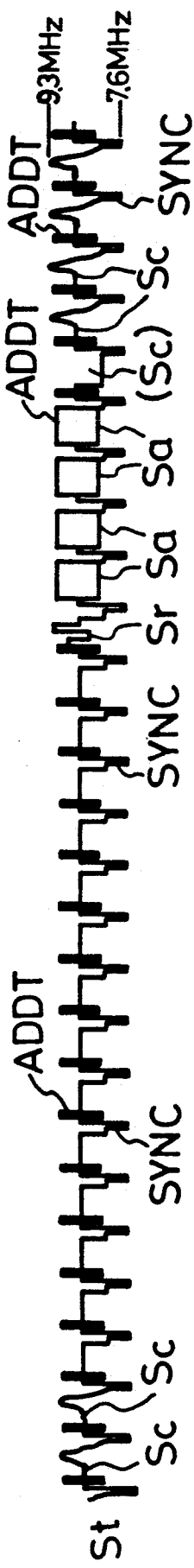

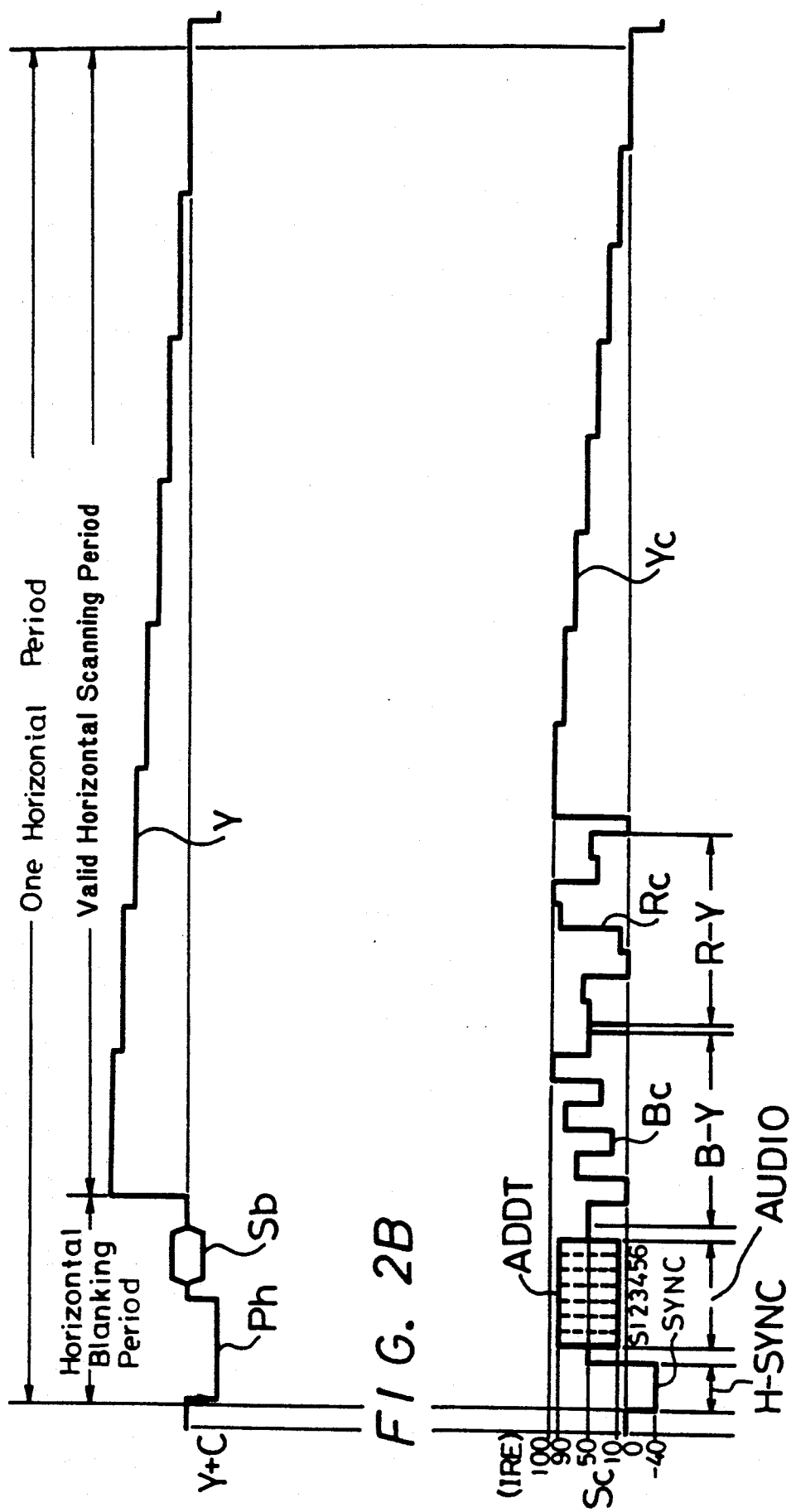

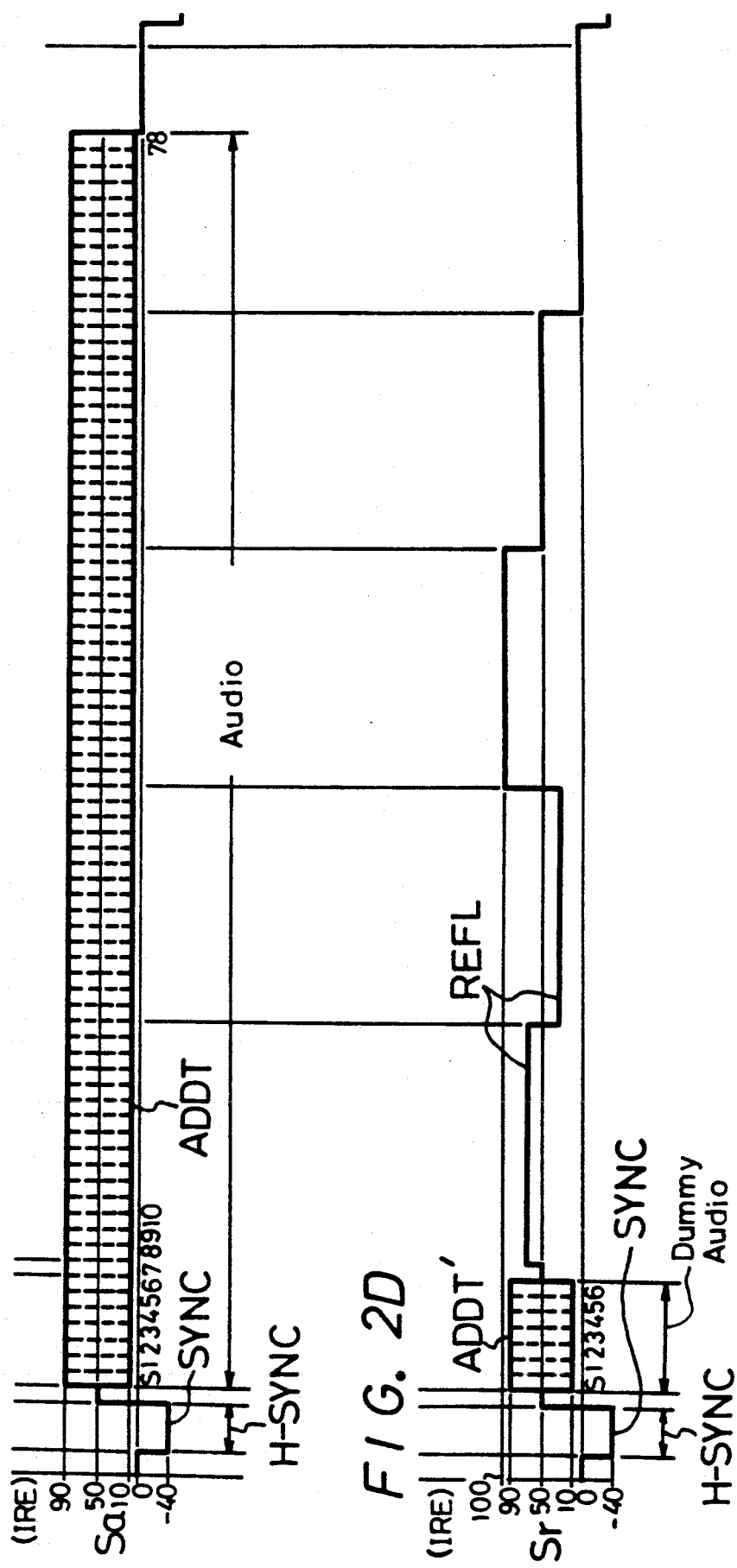

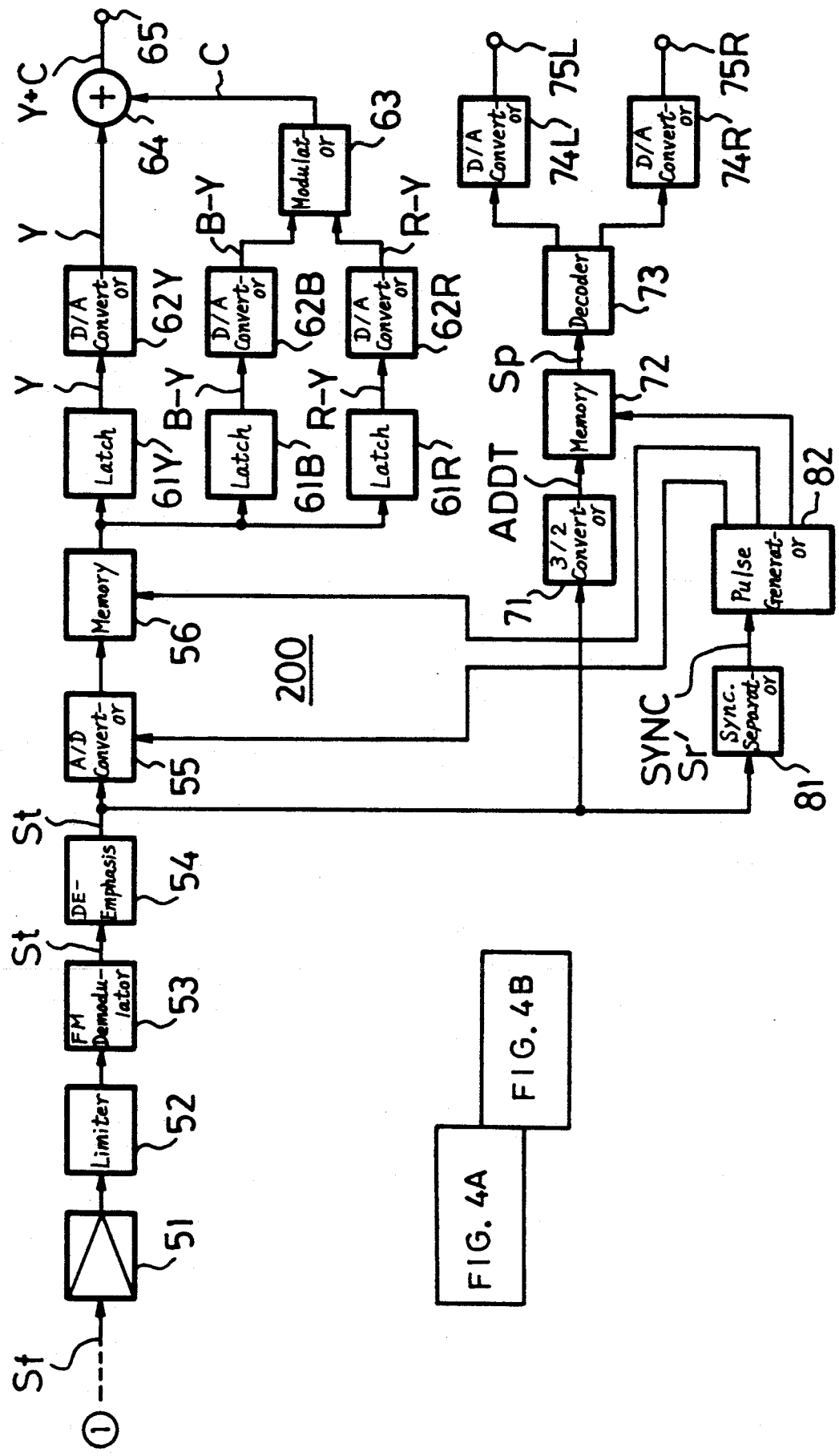

APPARATUS AND METHOD FOR RECORDING A COLOR TELEVISION SIGNAL ON AN OPTICAL DISC

This application is a continuation of application Ser. No. 07/180,340, filed Apr. 11, 1988, now abandoned.

BACKGROUND OF THE INVENTION

1. Field of the Invention

The present invention relates generally to an apparatus and a method for optically recording color image and audio signals, and more particularly is directed to an apparatus and method of this kind which are applicable to a so-called optical Write-Once system.

2. Description of the Prior Art

It has been proposed to record a color image signal and an audio signal or an optical disk with the frequency spectra shown in FIGS. 1A and 1B, respectively.

An optical recording method which employs the frequency spectrum of FIG. 1A is particularly used in the laser disk system, in which an FM signal $(Y+C)_{FM}$ frequency modulated by a color composite signal and an FM signal $A_{FM}$ frequency modulated by an analog audio signal are frequency-multiplexed and then recorded on an optical disk medium.

An optical recording method which employs the frequency spectrum of FIG. 1B is similar to that used for the home VTR system, in that an FM signal $Y_{FM}$ frequency modulated by a luminance signal, a low-band-converted carrier chrominance signal C and an FM signal $A_{FM}$ frequency modulated by an analog audio signal are frequency-multiplexed and then recorded on an optical disk medium. The latter method is disclosed in greater detail in U.S. Pat. No. 3,893,163.

However, the above mentioned optical recording methods give rise to problems, particularly when the disk and the optical head that are employed have non-linear recording and reproducing characteristics. Therefore, cross modulation may be produced between the signals $(Y+C)_{FM}$ and $A_{FM}$ in the case of the method using the spectrum of FIG. 1A, or among the signals $Y_{FM}$, C and $A_{FM}$ in the case of the method using the spectrum of FIG. 1B due to deterioration of the laser beam source, whereby the signal to noise (S/N) ratio of the reproduced image is lowered.

Moreover, in the case of the method which employs the frequency spectrum of FIG. 1A, it is difficult to control the phase of the carrier chrominance signal contained in the color composite signal, and this results in poor reproducibility of the color tone.

Furthermore, in the method which employs the frequency spectrum of FIG. 1B, the luminance signal and the carrier chrominance signal are recorded in different frequency bands so that time deviation between these signals may occur during reproduction.

OBJECTS AND SUMMARY OF THE INVENTION

Accordingly, it is an object of the present invention to provide an apparatus and method for optically recording color image and audio signals and which avoid the above-mentioned problems encountered in the prior art.

More specifically, it is an object of this invention to provide an apparatus and method for optically recording color image and audio signals, and which avoids cross-modulation between luminance and color difference signals defining the color image or between the luminance signal and the audio data so as to obtain a reproduced image with a high S/N ratio even though the optical disk and head or pickup used for recording and/or reproducing have non-linear characteristics or the characteristics of an optical system used for recording and/or reproducing have deteriorated.

Still another object of the invention is to provide an apparatus and method, as aforesaid, in which the color difference signals and the luminance signal are recorded and reproduced as frequency modulations of the same carrier so as to ensure good reproducibility of the color tone.

According to an aspect of the present invention, an apparatus for optically recording color image and audio signals on an optical disk, comprises: means for time-base-compressing one horizontal period portion of an original luminance signal of a standard TV signal and one horizontal period portion of two original color difference signals of the standard TV signal so as to generate a time-base-compressed video signal for one horizontal period; means for digitizing an audio signal; means for time-base-compressing the digitized audio signal; means for time-division-multiplexing the time-base-compressed digital audio signal with the time-base-compressed video signal; and means for recording the time-division-multiplexed signal on an optical disk.

According to another aspect of the invention, a method of recording color image and audio signals on an optical disk comprises the steps of: time-base-compressing one horizontal period portion of an original luminance signal of a standard TV signal and one horizontal period portion of two original color difference signals of the standard TV signal to generate a time-base-compressed video signal for one horizontal period; digitizing and time-base-compressing the audio signal to provide a time-base-compressed digital audio signal; time-division-multiplexing the time-base-compressed digital audio signal with the time-base-compressed video signal; and recording the time-division-multiplexed signal on an optical disk.

The above, and other objects, feature and advantages of the present invention, will become apparent from the following detailed description of a preferred embodiment when read in conjunction with the accompanying drawings, in which the same reference numerals designate like elements and parts in the several views.

BRIEF DESCRIPTION OF THE DRAWINGS

FIGS. 1A and 1B are graphic representations of respective frequency spectra which are employed in previously proposed methods for recording color image and audio signals on an optical disk;

FIG. 2A is a diagrammatic waveform of one horizontal period of a color composite signal according to the NTSC standard and which may be a source signal to be recorded according to this invention;

FIGS. 2B, 2C and 2D are diagrammatic waveforms of respective signals provided in accordance with an embodiment of the invention, and to which reference will be made in explaining the application of the invention to the recording on an optical disk of color image and audio signals;

FIG. 3A is a diagrammatic waveform particularly showing the vertical blanking period of the color composite signal of FIG. 2A, but shown with a different time base;

FIG. 3B is a diagrammatic waveform with the same time base as FIG. 3A, but showing how the signals of FIGS. 2B, 2C and 2D are combined according to the illustrated embodiment of the invention; and FIGS. 4A and 4B taken together form FIG. 4 which is a block diagram showing a recording and/or reproducing apparatus according to an embodiment of the invention.

DESCRIPTION OF THE PREFERRED EMBODIMENT

Figure 4A:
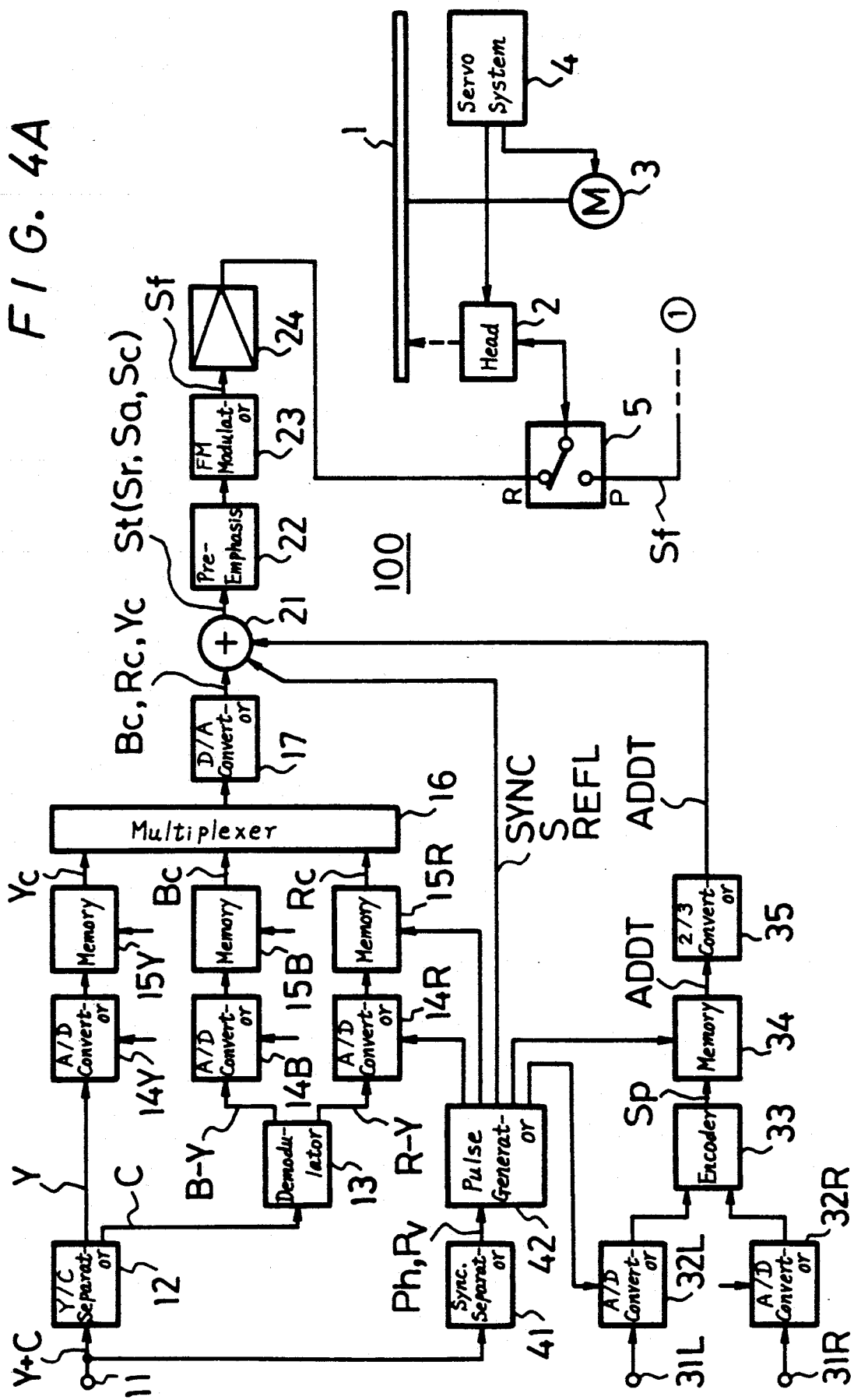

Referring to the drawings in detail, and initially to FIG. 2A which specifically shows a waveform of a color bar test pattern, it will be seen that the source of the color image signal to be recorded with an audio signal in accordance with this invention may be a color composite signal (Y+C) of the NTSC system which, in each horizontal period, includes a horizontal synchronizing pulse Ph, a burst signal $S_b$, a luminance signal Y, and a carrier chrominance signal (not shown). Further, as shown in FIG. 3A, the color composite signal (Y+C) of the standard NTSC system includes a vertical synchronizing pulse Pv during each vertical blanking period.

In accordance with this invention, the original color composite signal (Y+C) and the audio signal to be recorded therewith on an optical disk are processed, as hereinafter described in detail, to provide signals Sc, Sa and Sr which are shown on FIGS. 2B, 2C and 2D respectively, and which are combined to form a signal St shown on FIG. 3B.

More specifically, the signal Sc (FIG. 2B), which is recorded during an effective vertical scanning period (non-vertical blanking period), comprises a horizontal synchronizing signal H-SYNC, audio data ADDT, color difference signals Bc and Rc and a luminance signal Yc appearing successively in the order stated during one horizontal period.

The horizontal synchronizing signal H-SYNC is a narrow width pulse signal which is newly generated, that is, is other than the horizontal synchronizing pulse Ph of the standard TV signal, and is positioned at the head end portion of the signal Sc in each horizontal period. The audio data ADDT is a digital signal formatted in the same manner as, or conforming to the PCM audio signal for the so-called 8-mm video recorder system. In such system, original left and right channel stereo audio signals are first sampled at a frequency twice the horizontal frequency and are analog-to-digital converted by coding each sample in 10 bits. Then, the 10-bit sample is compressed to an 8-bit sample to which an error correcting code, a control code and the like are added, to thereby form the serial digital audio data ADDT. An example of the signal according to the 8-mm video recorder system as described above is shown, for example, in U.S. Pat. No. 4,562,578, having a common assignee herewith. However, the PCM audio signal ADDT employed in accordance with this invention is not limited to a signal formed in accordance with such system.

The audio data ADDT is formed of seven bytes per horizontal period, with the first byte being a synchronizing signal S having a particular bit pattern and the subsequent six bytes actually constituting audio data. The audio data ADDT is a signal converted from a binary code having the two levels "0" and "1" to a duo-binary code having three levels "10", "50" and "90" IRE.

The reason for converting the binary code signal to the duo-binary code is as follows:

The frequency spectrum of the binary code signal generally extends to 11 MHz, whereas signal transmission in the present Write-Once system is limited to a maximum band up to 7 MHz. It is therefore necessary to accommodate all information in a band up to 5.5 MHz by converting the binary code signal to the duo-binary code signal and thereby elevating the recording density. Such conversion can be effected by known logical circuits in which the binary code data can be encoded to the duo-binary code data "1", "0" and "−1", and the inverting condition of the binary code data sequence is detected.

The color difference signals Bc and Rc respectively correspond to the blue color difference signal (B-Y) and the red color difference signal (R-Y) for the effective horizontal scanning period within a horizontal period and are time-base-compressed to each occupy a time interval which is 1/6 that of the effective horizontal scanning period.

The luminance signal Yc corresponds to the luminance signal Y for the effective horizontal scanning period within a horizontal period and is time-base-compressed to occupy a time interval which is 2/3 that of the effective horizontal scanning period.

As shown on FIG. 2C, the signal Sa comprises the horizontal synchronizing signal H-SYNC and audio data ADDT and, as shown on FIG. 3B, is recorded in each of several horizontal periods within the vertical blanking period V-BLK (FIG. 3A). In the case of the signal Sa, the audio data ADDT thereof comprises the synchronizing signal S for the audio data at its head end and, thereafter, 78 bytes actually used for audio data. The audio data ADDT in signal Sa is a duo-binary signal in the same manner as the previously described audio data in the signal Sc.

The signal Sr, which is shown on FIG. 3B to be also recorded within the vertical blanking period V-BLK (FIG. 3A), is a reference marker signal for indicating a horizontal line which marks the beginning of each field period. The signal Sr is shown on FIG. 2D to comprise the horizontal synchronizing signal H-SYNC, dummy audio data ADDT and a signal REFL having a predetermined level pattern.

As is apparent from a comparison of FIGS. 3A and 3B, the seventh horizontal period in advance of the end of the vertical blanking period V-BLK is assigned to the reference marker signal Sr, the next four horizontal periods are each assigned to the signal Sa, the next one horizontal period is assigned to a signal (Sc) which is similar to the signal Sc of FIG. 2B but has no signals Bc, Rc and Yc, and the following approximately 250 horizontal periods are each assigned to the signal Sc. The interval in the vertical blanking period of the color composite signal (Y+C) which is assigned to the vertical synchronizing pulse Pv and the subsequent several horizontal periods of the color composite signal (FIG. 3A) are, in the signal St (FIG. 3B), assigned to a track jump period for track access or the like in which the signal SYNC is exclusively recorded.

The signal St comprising the signals Sr, Sa and Sc is converted to an FM signal Sf. To be more specific, the conversion of signal St to FM signal Sf is such as to provide the latter with the frequency 7.6 MHz for a sync. tip level (−40 IRE) of the signal St and with the frequency 9.3 MHz for a white peak level (100 IRE). The signal Sf is recorded on a spiral track formed on an optical disk in such a manner that one frame period, that is, a two-field period, of the signal Sf corresponds to one circle or turn of the spiral track formed on the optical disk. It will be appreciated that, in accordance with the invention, the luminance signal Y, the color difference signals (B-Y) and (R-Y) and the audio signal ADDT are time-division-multiplexed, with the audio signal ADDT being dispersed and recorded on the optical disk at positions corresponding to the horizontal blanking periods and the vertical blanking periods of the original color composite signal (Y+C) or signal source shown on FIGS. 2A and 3A.

A recording and/or reproducing apparatus according to an embodiment of the present invention will now be described with reference to FIG. 4 which is comprised of FIGS. 4A and 4B illustrating recording and reproducing sections, respectively, of the apparatus.

As shown in FIG. 4A, a Write-Once type optical disk 1 is rotated at a frame frequency by a motor 3. An optical head or recording and/or reproducing pick-up 2 is arranged in facing relation to the optical disk 1 and is conventionally movable in the radial direction thereof. A known servo mechanism 4 is provided to servo-control the head 2 and motor 3, and, as usual, has various functions, such as, focus servo, tracking servo, slide servo, screw servo, spindle servo and the like.

A recording section 100 of the apparatus is shown to receive the color composite signal (Y+C) through an input terminal 11 from which the color composite signal is supplied to a Y/C separating circuit 12 to be separated into the luminance signal Y and the carrier chrominance signal C. The carrier chrominance signal C is supplied to a color demodulating circuit 13 to be demodulated as the blue and red color difference signals (B-Y) and (R-Y) which in turn are supplied to A/D converters 14B and 14R, respectively. The separated luminance signal Y is similarly supplied to an A/D converter 14Y.

The A/D converters 14Y, 14B and 14R, together with rear stage memories 15Y, 15B and 15R, respectively, a multiplexer 16 and a D/A converter 17, form time-base compressing circuits for the signals (B-Y), (R-Y) and Y. The D/A converter 17 delivers corresponding time-base-compressed signals Bc, Rc and Yc to a first input of an adder circuit 21 at every horizontal period during the effective vertical scanning period.

Left and right channel stereo audio signals are respectively supplied by way of input terminals 31L and 31R and A/D converters 32L and 32R to an encoder 33 to be encoded into a PCM audio signal Sp which has the same format as the PCM audio signal for the 8-mm VTR. The PCM audio signal Sp is stored in a buffer memory 34 and read out therefrom, at predetermined times, as the audio data ADDT to be included in the signals Sc, Sa and Sr. The audio data ADDT is then supplied to a binary to duo-binary converting circuit 35 to be converted to the duo-binary audio data ADDT which is supplied to a second input of the adder circuit 21.

The color composite signal (Y+C) is also shown to be supplied from input terminal 11 to a synchronizing signal separating circuit 41 wherein the horizontal and vertical synchronizing pulses Ph and Pv are extracted. The synchronizing pulses Ph and ?v are supplied to a pulse generator 42 in which a variety of control signals having different timings and which are necessary for recording signal processing are generated on the basis of the pulses Ph and Pv and then supplied to the respective circuits which require them. Thus, for example, the write/read speeds and timings of analog-to-digital (A/D) converters 14Y, 14B, 14R, 32L and 32R and memories 15Y, 15B, 15R, and 34 are controlled by corresponding control signals generated by the pulse generator 42, and which are not described in detail.

Further, the previously described signals H-SYNC, S and REFL are generated by the pulse generator 42 at the respective times and are supplied to a third input of the adder circuit 21. Therefore, the adder circuit 21 outputs the signal St comprising the signals Sc, Sa and Sr shown in FIGS. 2B, 2C and 2D, respectively, and occurring in the sequence shown in FIG. 3B.

The signal St is supplied through a pre-emphasis circuit 22 to an FM modulating circuit 23 to be modulated to the FM signal Sf. The FM signal Sf is supplied to a recording amplifier 24 to be arranged in a pulse sequence or train which is, in turn, supplied through a recording contact R of a recording/reproducing change-over switch 5 to the optical head 2 for recording by the latter in successive circular tracks on the optical disk 1 in a manner such that one field of the color composite signal corresponds to one-half of a circular track and the successive circular tracks are spirally formed on the disk 1.

During reproducing or playback operation of the apparatus embodying this invention, the signal Sf recorded on the optical disk 1 is reproduced by the optical head 2 and supplied, by way of a reproducing or playback contact P of the recording/reproducing change-over switch 5, to the reproducing section 200 of the apparatus shown on FIG. 4B. In reproducing section 200, the reproduced signal Sf is supplied through a reproducing amplifier 51 and a limiter 52 to an FM demodulating circuit 53 wherein the signal St is demodulated. The demodulated signal St is supplied through a de-emphasis circuit 54 to an A/D converter 55 which forms a time-base expansion circuit and a time-base correction (TBC) circuit together with a memory 56, latch circuits 61Y, 1B and 61R and D/A converters 62Y, 62B and 62R arranged thereafter. The converters 62Y, 62B and 62R respectively deliver the signals Y, (B-Y) and (R-Y) which have been expanded to the original time base.

The expanded signal Y is supplied to a first input of an adder circuit 64, while the expanded signals (B-Y) and (R-Y) are supplied to a modulating circuit 63 to generate the carrier chrominance signal C comprising the burst signal Sb. The carrier chrominance signal C is then supplied to a second input of the adder circuit 64. The reproduced original color composite signal (Y+C) is delivered from the adder circuit 64 to an output terminal 65.

Further, the signal St form the de-emphasis circuit 54 is supplied to a duo-binary-to-binary code converting circuit 71 which converts the data ADDT contained in the reproduced signal St to a binary code signal. The resulting binary code data ADDT is sequentially written into a memory 72 and read out therefrom at a predetermining timing so as to be expanded to the original time base. The resulting signal Sp derived from the data ADDT in he memory 72 is supplied to a decoder 73 to be subjected to suitable signal processings, such as, error correction and 8-bit to 10-bit data conversion or the like. The processed or decoded signal is supplied to D/A converters 74L and 74R which provide reproduced left and right channel stereo audio signals delivered to output terminals 75L and 75R, respectively.

Finally, it will be seen that the signal St from the de-emphasis circuit 54 is also delivered to a synchronizing signal separating circuit 81 wherein the synchronizing signal SYNC and a signal Sr' indicative of the signal Sr are separated from the demodulated signal St. These signals are supplied from separator 81 to a pulse generator 82, wherein a variety of control signals, with respective different timings, necessary for reproduced signal processing are generated and then supplied to control the timing of respective circuits, such as, A/D converter 55, and memories 56 and 72. Such control signals from pulse generator 82 are not described in detail, but it will be understood that they are based on the signals SYNC and Sr' which are separated from the signal St demodulated from the reproduced signal Sf.

It will be appreciated that, in the method and apparatus according to the invention, since the luminance signal Y, the color difference signals (B-Y) and (R-Y) and the audio signal ADDT are time-division-multiplexed and then recorded on, and reproduced from the disk 1, it is possible to avoid cross modulation among the luminance signal Y and the color difference signals (B-Y) and (R-Y) or between the luminance signal Y and the audio data ADDT so as to obtain a reproduced image with a high S/N ratio even though the disk 1 and the head 2 have non-linear characteristics or the characteristics of the optical system or the like have deteriorated.

It is also to be appreciated that the color difference signals (B-Y) and (R-Y) are recorded and reproduced on the basis of the same FM signal Sf as the luminance signal Y so as to achieve an improved S/N ratio and good reproducibility of the color tone.

Moreoever, the audio data ADDT are dispersed in the horizontal and vertical blanking periods of the original signal (Y+C), so that the signals Yc, Bc and Rc can occupy relatively longer portions of each horizontal period, with the result that the degree of time-base compression can be correspondingly reduced. Consequently, the maximum frequency of signals Yc, Bc and Rc can be supressed, to thereby facilitate recording on, and reproducing from the disk 1 and further improve the S/N ratio in this respect.

Although the invention has been described above as applied to a source signal (Y+C) of the NTSC system, the present invention can be similarly applied to the CCIR system to achieve the same advantageous results. Further, the invention can be applied when the signal to be processed is a component signal (three-primary-color signal) rather than a composite signal. Moreover, any method of recording on, and reproducing from the disk 1 by the use of a laser beam can be employed in connection with the present invention.

Although a single preferred embodiment or the invention has been described in detail with reference to the accompanying drawings, it is to be understood that the invention is not limited to that precise embodiment, and that many modifications and variations could be effected therein by one skilled in the art without departing from the spirit or scope of the invention as defined in appended claims.

What is claimed is:

1. An apparatus for optically recording a color image signal and an audio signal on an optical disk, comprising;

means for time-base-compressing one horizontal period portion of an original luminance signal and one horizontal period portion of two original color difference signals of a standard television signal which includes a reference horizontal synchronizing pulse in a horizontal blanking period to generate a time-base-compressed video signal for one horizontal period;

means for digitizing an audio signal;

means for generating a time-base-compressed audio signal from the digitized audio signal;

timing means for dispersing said time-base-compressed audio signal in a vertical blanking period of said standard television signal;

means for generating a relatively narrow horizontal synchronizing pulse from said reference horizontal synchronizing pulse;

means for combining the dispersed time-base-compressed audio signal and said time-base-compressed video signal to generate a time-division-multiplexed signal in which said dispersed time-base-compressed audio signal and said time-base-compressed video signal are time-division multiplexed with each other;

means for inserting said time-base-compressed audio signal next to said relatively narrow horizontal synchronizing pulse in said horizontal blanking period of said time-division-multiplexed signal;

means for inserting a marker signal for indicating the start of a filed period in which said time-base-compressed audio signal has been dispersed in said vertical blanking period and recorded at every horizontal period;

means for frequency-modulating said time-division-multiplexed signal with a common carrier signal; and means for recording the frequency-modulated time-division-multiplexed signal on an optical disk.

2. An apparatus according to claim 1; further comprising means for converting said time-base-compressed digital audio signal to a duo-binary signal; and in which said duo-binary signal is time-division-multiplexed with said time-base-compressed video signal.

3. An apparatus according to claim 1; further comprising means for time-division-multiplexing said relatively narrow horizontal synchronizing pulse, said time-base-compressed digital audio signal, said time-base-compressed color difference signals and said time-base-compressed luminance signal.

* * * * *